(12) United States Patent
White et al.

(10) Patent No.: US 9,712,530 B2
(45) Date of Patent: Jul. 18, 2017

(54) SYSTEMS AND METHODS FOR ENFORCING SECURITY IN MOBILE COMPUTING

(71) Applicant: Optio Labs, Inc., Boston, MA (US)

(72) Inventors: Christopher Jules White, Blacksburg, VA (US); Thomas Charles Clancy III, Washington, DC (US); Brian Dougherty, Nashville, TN (US)

(73) Assignee: OPTIO LABS, INC., Boston, MA (US)

( * ) Notice: Subject to any disclaimer, the term of this patent is extended or adjusted under 35 U.S.C. 154(b) by 0 days.

(21) Appl. No.: 13/735,885

(22) Filed: Jan. 7, 2013

(65) Prior Publication Data

US 2013/0179991 A1     Jul. 11, 2013

Related U.S. Application Data

(60) Provisional application No. 61/583,605, filed on Jan. 6, 2012, provisional application No. 61/583,610, filed on Jan. 6, 2012, provisional application No. 61/584,284, filed on Jan. 8, 2012.

(51) Int. Cl.
| | |
|---|---|
| *G06F 17/30* | (2006.01) |
| *H04L 29/06* | (2006.01) |
| *G06F 21/53* | (2013.01) |
| *G06F 21/57* | (2013.01) |

(52) U.S. Cl.
CPC .............. *H04L 63/10* (2013.01); *G06F 21/53* (2013.01); *G06F 21/577* (2013.01); *H04L 63/0227* (2013.01); *H04L 63/20* (2013.01)

(58) Field of Classification Search
CPC ...... G06F 21/56; G06F 21/566; G06F 21/568; G06F 21/577; G06F 9/4428
See application file for complete search history.

(56) References Cited

U.S. PATENT DOCUMENTS

| | | |
|---|---|---|
| 6,317,868 B1 | 11/2001 | Grimm et al. |
| 6,467,086 B1 | 10/2002 | Kiczales et al. |
| 7,207,041 B2 | 4/2007 | Elson et al. |
| 7,461,144 B1 | 12/2008 | Beloussov et al. |
| 7,681,226 B2 | 3/2010 | Kraemer et al. |
| 7,966,599 B1 | 6/2011 | Malasky et al. |
| 8,099,596 B1 * | 1/2012 | Rusakov et al. ............. 713/164 |

(Continued)

FOREIGN PATENT DOCUMENTS

| | | |
|---|---|---|
| JP | 2002-506247 | 2/2002 |
| JP | 2005-184836 A | 7/2005 |

(Continued)

OTHER PUBLICATIONS

Extended European Search Report issued by the European Patent Office for European Patent Application No. 13733798.6 dated May 6, 2015 (6 pages).

(Continued)

*Primary Examiner* — Mohammed Waliullah
(74) *Attorney, Agent, or Firm* — Wilmer Cutler Pickering Hale and Dorr LLP

(57) ABSTRACT

Methods and systems described herein relate to enhancing security on a device by configuring one or more software functions in a trusted zone of a processor using object firewalls, IPC mechanisms, and/or a policy engine.

22 Claims, 5 Drawing Sheets

(56) References Cited

U.S. PATENT DOCUMENTS

| | | |
|---|---|---|
| 8,225,329 B1 | 7/2012 | Lynn |
| 8,387,048 B1 | 2/2013 | Grechishkin et al. |
| 8,490,191 B2 | 7/2013 | Kuegler et al. |
| 8,505,029 B1 | 8/2013 | Chanda et al. |
| 8,516,095 B2 | 8/2013 | Eisener et al. |
| 8,533,860 B1 | 9/2013 | Grecia |
| 8,584,229 B2 | 11/2013 | Brutch et al. |
| 8,595,832 B1 | 11/2013 | Yee et al. |
| 8,613,052 B2 | 12/2013 | Weiss |
| 8,655,307 B1 | 2/2014 | Walker et al. |
| 8,874,891 B2 | 10/2014 | Gattegno |
| 8,887,308 B2 | 11/2014 | Grecia |
| 8,898,481 B1 | 11/2014 | Osburn, III et al. |
| 9,191,382 B1 | 11/2015 | Hornung et al. |
| 2002/0052965 A1 | 5/2002 | Dowling |
| 2003/0115291 A1 | 6/2003 | Kendall et al. |
| 2003/0140088 A1 | 7/2003 | Robinson et al. |
| 2003/0149874 A1 | 8/2003 | Balfanz et al. |
| 2003/0194094 A1 | 10/2003 | Lampson et al. |
| 2004/0199763 A1 | 10/2004 | Freund |
| 2004/0255145 A1 | 12/2004 | Chow |
| 2005/0060365 A1 | 3/2005 | Robinson et al. |
| 2005/0071643 A1 | 3/2005 | Moghe |
| 2005/0136845 A1 | 6/2005 | Masuoka et al. |
| 2005/0138416 A1* | 6/2005 | Qian et al. ............ 713/201 |
| 2005/0240396 A1 | 10/2005 | Childs et al. |
| 2005/0240985 A1 | 10/2005 | Alkove et al. |
| 2005/0246453 A1 | 11/2005 | Erlingsson et al. |
| 2005/0246522 A1 | 11/2005 | Samuelsson et al. |
| 2005/0246718 A1 | 11/2005 | Erlingsson et al. |
| 2006/0020821 A1 | 1/2006 | Waltermann et al. |
| 2006/0048226 A1 | 3/2006 | Rits et al. |
| 2006/0092037 A1 | 5/2006 | Neogi et al. |
| 2006/0224742 A1 | 10/2006 | Shahbazi |
| 2007/0088792 A1 | 4/2007 | Piper et al. |
| 2007/0186274 A1 | 8/2007 | Thrysoe et al. |
| 2007/0271594 A1 | 11/2007 | Wobber et al. |
| 2008/0025503 A1 | 1/2008 | Choi et al. |
| 2008/0115011 A1 | 5/2008 | Codrescu et al. |
| 2008/0126800 A1 | 5/2008 | Guo et al. |
| 2008/0134347 A1 | 6/2008 | Goyal et al. |
| 2008/0235587 A1 | 9/2008 | Heie et al. |
| 2008/0278408 A1 | 11/2008 | Strickland et al. |
| 2009/0025011 A1 | 1/2009 | Neil et al. |
| 2009/0030974 A1 | 1/2009 | Boudreau et al. |
| 2009/0138547 A1 | 5/2009 | Boudreau |
| 2009/0204815 A1 | 8/2009 | Dennis et al. |
| 2009/0282477 A1 | 11/2009 | Chen et al. |
| 2009/0319782 A1 | 12/2009 | Lee |
| 2010/0023582 A1 | 1/2010 | Pedersen et al. |
| 2010/0031252 A1 | 2/2010 | Horwitz |
| 2010/0031325 A1 | 2/2010 | Maigne et al. |
| 2010/0037311 A1 | 2/2010 | He et al. |
| 2010/0121567 A1 | 5/2010 | Mendelson |
| 2010/0121597 A1 | 5/2010 | Steffens et al. |
| 2010/0153697 A1 | 6/2010 | Ford et al. |
| 2010/0306759 A1 | 12/2010 | Kohler et al. |
| 2011/0023115 A1 | 1/2011 | Wright |
| 2011/0055890 A1 | 3/2011 | Gaulin et al. |
| 2011/0067107 A1 | 3/2011 | Weeks et al. |
| 2011/0151955 A1 | 6/2011 | Nave |
| 2011/0197201 A1 | 8/2011 | Yoo et al. |
| 2011/0225624 A1 | 9/2011 | Sawhney et al. |
| 2011/0258426 A1 | 10/2011 | Mujtaba et al. |
| 2012/0033678 A1 | 2/2012 | Page et al. |
| 2012/0084381 A1 | 4/2012 | Alladi et al. |
| 2012/0084792 A1 | 4/2012 | Benedek et al. |
| 2012/0116602 A1 | 5/2012 | Vaswani et al. |
| 2012/0129503 A1 | 5/2012 | Lindeman et al. |
| 2012/0191677 A1 | 7/2012 | Lim |
| 2012/0197988 A1 | 8/2012 | Leppanen et al. |
| 2012/0210417 A1 | 8/2012 | Shieh |
| 2012/0215637 A1 | 8/2012 | Hermann |
| 2012/0254602 A1 | 10/2012 | Bhansali et al. |
| 2012/0255014 A1* | 10/2012 | Sallam ............ 726/24 |
| 2012/0258730 A1 | 10/2012 | Tinnakornsrisuphap et al. |
| 2012/0304310 A1 | 11/2012 | Blaisdell |
| 2013/0007873 A1 | 1/2013 | Prakash et al. |
| 2013/0054812 A1 | 2/2013 | DeCoteau |
| 2013/0067488 A1* | 3/2013 | Kumar et al. ............ 719/313 |
| 2013/0083722 A1 | 4/2013 | Bhargava et al. |
| 2013/0086202 A1 | 4/2013 | Connelly et al. |
| 2013/0091543 A1 | 4/2013 | Wade et al. |
| 2013/0111039 A1 | 5/2013 | Gomes |
| 2013/0124840 A1 | 5/2013 | Diluoffo et al. |
| 2013/0145362 A1 | 6/2013 | Dawson et al. |
| 2013/0179991 A1 | 7/2013 | White et al. |
| 2013/0227641 A1 | 8/2013 | White et al. |
| 2013/0232573 A1 | 9/2013 | Saidi et al. |
| 2013/0268997 A1 | 10/2013 | Clancy, III et al. |
| 2013/0291056 A1 | 10/2013 | Gaudet et al. |
| 2013/0312058 A1 | 11/2013 | Thompson et al. |
| 2013/0343198 A1 | 12/2013 | Chhabra et al. |
| 2014/0059357 A1 | 2/2014 | Andersson et al. |
| 2014/0068778 A1 | 3/2014 | Bhatia et al. |
| 2014/0075451 A1 | 3/2014 | Anderson et al. |
| 2014/0201807 A1 | 7/2014 | White et al. |
| 2014/0235270 A1 | 8/2014 | Zhang et al. |
| 2014/0256251 A1 | 9/2014 | Caceres et al. |
| 2014/0273857 A1 | 9/2014 | White et al. |
| 2014/0282857 A1 | 9/2014 | White et al. |
| 2014/0282992 A1 | 9/2014 | Clancy, III et al. |
| 2014/0283136 A1 | 9/2014 | Dougherty et al. |

FOREIGN PATENT DOCUMENTS

| | | |
|---|---|---|
| JP | 2009-289198 A | 12/2009 |
| WO | WO-99/45454 A1 | 9/1999 |

OTHER PUBLICATIONS

Bertino et al., "Location-Based Access Control Systems for Mobile Users—Concepts and Research Directions," SPRINGL '11 ACM, Chicago, IL, Nov. 1, 2011 (pp. 49-52) (4 pages).

Cogen, "Android 101: Rooting, Jailbreaking, and Unlocking," http://theunlockr.com/2010/08/27/android-101-rooting-jailbreaking-and-unlocking Accessed Dec. 15, 2014 (8 pgs.).

Fenzi, "Tuning Your SELinux Policy with Audit2allow," http://collaboration.cmc.ec.gc.ca/science/rpn/biblio/ddj/Website/articles/Sa/v14/i08/a1.htm Accessed Dec. 15, 2014 (6 pgs.).

Garfinkel, "Traps and Pitfalls: Practical Problems in System Call Interposition Based Security Tools," The 10th Annual Network and Distributed System Security Symposium, Feb. 2003 (14 pgs.).

International Search Report and Written Opinion issued by the United States Patent and Trademark Office as International Searching Authority for International Application No. PCT/US14/47826 dated Apr. 1, 2015 (8 pages).

International Search Report and Written Opinion issued by the United States Patent and Trademark Office as International Searching Authority for International Application No. PCT/US2015/020492 mailed Jun. 25, 2015 (7 pages).

International Search Report and Written Opinion issued by the United States Patent and Trademark Office as International Searching Authority for International Application No. PCT/US14/33344 mailed on Sep. 11, 2014 (12 pages).

Kotrappa et al., "Multilevel Security Using Aspect Oriented Programming AspectJ," 2010 International Conference on Advances in Recent Technologies in Communication and Computing, IEEE Computer Society, No Month 2010, (pp. 369-373) (5 pages).

Schreiber, "Android Binder Android Interprocess Communication," Ruhr-Universitat Bochum, Seminarthesis, Oct. 5, 2011 (34 pgs.).

Shimko et al., "Securing Inter-process Communications in SELinux," Tresys Technology, Mar. 12, 2007 (10 pgs.).

Debbabi, M., et al., "Java for Mobile Devices: A Security Study", Proceedings of the 21st Annual Computer Security Applications Conference (ACSAC 2005) (10 pages).

Grønli, T., et al., "Android vs Windows Mobile vs Java ME: A comparative Study of Mobile Development Environments", PETRA'10, Samos, Greece, Jun. 23-25, 2010 (8 pages).

(56) References Cited

OTHER PUBLICATIONS

Ion, I., et al., "Extending the Java Virtual Machine to Enforce Fine-Grained Security Policies in Mobile Devices", 23rd Annual Computer Security Applications Conference, ACSAC, pp. 233-242, 2007 (10 pages).
Proceedings of the 52nd (1996, the first term) Annual Convention(1) of Information Processing Society of Japan (IPSJ), Information Processing Society of Japan (IPSJ), Mar. 6, 1996, pp. 1-75-1-76 (4 pages)-Japanese Language.

* cited by examiner

SYSTEMS AND METHODS FOR ENFORCING SECURITY IN MOBILE COMPUTING

CROSS-REFERENCE TO RELATED APPLICATIONS

This application is a Non-Provisional Application of the following United States Provisional Applications, each of which is hereby incorporated by reference herein in its entirety: U.S. Provisional Application Ser. No. 61/583,605, entitled METHOD TO ENFORCE DATA PROVENANCE IN MOBILE COMPUTING, filed Jan. 6, 2012; U.S. Provisional Application Ser. No. 61/583,610, entitled METHOD TO PROTECT AGAINST MALWARE THREATS IN MOBILE COMPUTING, filed Jan. 6, 2012; and U.S. Provisional Application Ser. No. 61/584,284, entitled METHOD TO ENFORCE SECURITY POLICIES USING A DISTRIBUTED OBJECT-ORIENTED IPC FIREWALL, filed Jan. 8, 2012.

BACKGROUND

Field

The present invention is related to mobile device security.

Description of the Related Art

Software and data related security of current devices, especially mobile devices, rely on a variety of features including virtual machines, inter-process communication, package managers, mobile device management systems, touch screen software components, shared memory, relational databases, device configuration signature checking, specialized debugging interfaces (e.g. Android Debug Bridge, and the like), trusted daemon processes, and the like. In an example, Android mobile devices use checks on inter-process communication to determine if an application should gain access to a particular system resource, such as the user's contact list. Virtual machine security checks, such as determining whether or not a specific native library should be loaded, are also employed.

A key challenge with mobile devices is that it is difficult to ensure the integrity of the very software that is relied upon to provide security (e.g. virtual machine, device I/O, inter-process communication, specialized debugging interfaces, and other components). A need exists for systems that provide security, such as by enforcing data provenance, protecting against malware and enforcing security policies via inter-process communications mechanisms.

SUMMARY

In embodiments, method and systems of filtering access to a resource having one or more inter-process control paths between two or more objects that are controlled by one or more object firewalls in the device may use a processor to control access to the resource from an application based on a policy. Controlling access to the resource from an application based on a policy may comprise providing the policy and filtering access through the inter-process control path to the object providing access to the resource.

In embodiments, methods and systems may further comprise using a computer processor to generate a device-based context based on one or more of the current date and time, the current location of the device, the identity of a current user of the device, the identity of each application currently executing on the device, and the identity of each resource currently in use.

In embodiments, controlling access to the device resource from an object associated with an application based upon a policy may comprise providing a context-aware policy engine to control access to the resource. In embodiments, the context-aware policy may be enabled to communicate with a policy server to communicate one or more policies.

In embodiments, the policy governing the inter-process communications to the object may be a context-related policy.

In embodiments, the resource may be one of a network connection, a cellular connection, a keyboard, a touch interface, an operating system, an application, a part of an application programming interface, a software driver, a database, a port, a wireless communication interface, and a secured area in memory.

In embodiments, the object firewall may record resource access attempts.

In embodiments, the object firewall may be stored in a centralized object registry.

In embodiments, the objects providing access to the resource are stored in a centralized registry.

In embodiments, the policies may be authored using a graphical user interface, which may be stored in a first format, translated into a second format for transmission to a device, and may be parsed by a receiving device in order to determine how to configure one or more object firewalls.

In embodiments, a computer processor may be used to control and configure the object firewalls in a single process associated with a device security system.

In embodiments, methods and systems of enforcing distributed policies in a mobile network may comprise at least one processor adapted to provide an inter-process communications firewall on a device to enforce one or more rules governing communication between at least two systems that may communicate via the device, wherein the at least one processor is adapted to generate, via a policy engine associated with the inter-process communications firewall, an indicator of the context of at least one of the systems that communicate via the device, and said at least one processor adapted to determine whether a communication between the at least two systems is permitted by the inter-process communications firewall based on a policy and the context of at least one of the systems.

In embodiments, the at least one processor may be adapted to provide a plurality of inter-process communications firewalls on a device. In embodiments, said firewalls may be provided to enforce one or more rules governing communication between at least two systems that may communicate via the device.

In embodiments, the at least one processor may be adapted to generate the policy engine wherein the policy engine is enabled to communicate with a policy server to communicate one or more policies.

In embodiments, the policy may be comprised of one or more of a black list, a white list a signing policy, a naming policy, a checksum analysis policy, a library analysis policy, and a permission for one or more of an application, a process, a user, and a group of users.

In embodiments, the inter-process communications firewall may be an object-oriented firewall. In embodiments, the object-oriented firewall may be associated with an application executing on the device.

In embodiments, the at least one processor adapted to determine whether a communication between the at least two systems is permitted by the inter-process communications firewall may be adapted to determine, based on the content of the communication, whether a communication between the at least two systems is permitted by the inter-process communications firewall.

In embodiments, methods and systems of securing a mobile device from malware may comprise using a computer processor to pass a remote procedure call from a first application to an inter-process control data bus, requesting, from a policy engine by the inter-process control data bus, a policy validation for the remote procedure call, determining by the policy engine whether to approve the remote procedure call based on the context of the remote procedure call and a stored policy, communicating the determination from the policy engine back to the inter-process control data bus, and at least one of permitting and blocking the remote procedure call by the inter-process control data bus in response to the determination.

In embodiments, passing the remote procedure call may comprise passing a remote procedure call for a second object associated with a second application from first object associated with a first application to an inter-process control data bus.

In embodiments, the policy engine may be enabled to communicate with a policy server to communicate one or more policies.

In embodiments, the methods and systems of securing a mobile device from malware may comprise providing an inter-process controller for installing new object firewalls as new objects are created.

In embodiments, the methods and systems of securing a mobile device from malware may comprise at least one of permitting and blocking the remote procedure call by the inter-process control data bus in response to the determination, wherein the at least one of permitting and blocking the remote procedure call by the inter process control data bus in response to the determination may further comprise at least one of permitting the remote procedure call without modification, permitting the remote procedure call with modified contents of the remote procedure call, permitting the remote procedure with a modified return value of the data sent from a resource in response to the remote procedure call, blocking the remote procedure call, logging the remote procedure call, ignoring the remote procedure call, modifying one or more firewall rules, adding one or more firewall policies, and removing one or more firewall policies.

In embodiments, the methods and systems of securing a mobile device from malware may comprise a context-aware policy engine. In embodiments, the context-aware policy engine may be further enabled to generate a system-specific context, said system-specific context comprising one or more of the current date, the current time, the location of the mobile device, the identity of the device user, and applications currently executing on the mobile device.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE PREFERRED EMBODIMENTS

Figure 1:
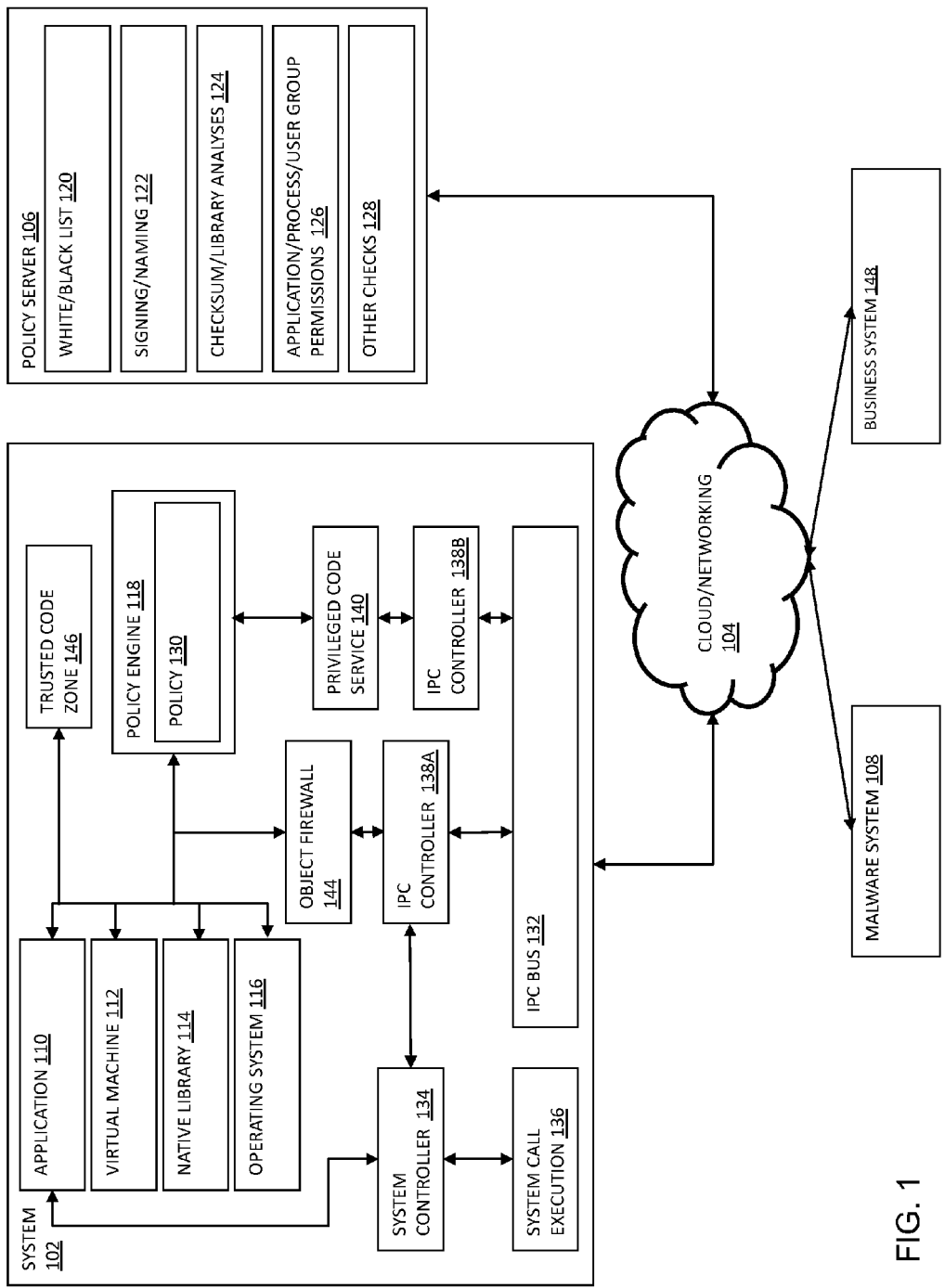
FIG. 1 depicts methods and systems for securing a device.

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed structure. Further, the terms and phrases used herein are not intended to be limiting, but rather to provide an understandable description of the invention.

Mobile devices, such as smartphones, tablets and other web-connected devices are proliferating, both for use as business tools and for personal use. Such mobile devices may provide a platform for collecting, storing, processing and communicating data. In many cases, such data may be personal and/or confidential, such as personal contacts, financial information, and business materials.

Consequent to the proliferation of mobile devices, mobile security is an increasing area of concern in the field of mobile computing. Mobile security may be implemented in a variety of ways. As disclosed herein, several ways of providing mobile security may include protecting the data stored and communicated by the mobile devices and controlling the ability of the software on the devices to access other resources.

In embodiments, methods of securing a device may include filtering access to a device or system resource by controlling access based upon a policy, wherein the policy may be applied by a firewall to filter and/or control the inter-process control paths by which messages may be delivered between the objects that control the system resources, based on a policy governing the inter-process communication between the objects. In some embodiments, the device may be a cellular phone, such as an iPhone, a Motorola Droid Razr Maxx, a HTC One X, a Samsung Focus 2, a Samsung Gusto 2, or some other cellular phone. In other embodiments, the device may be a tablet, such as an iPad, an Asus Eee Pad Transformer Prime, a Sony Tablet S, a Samsung Galaxy Tab 10.1, or some other tablet. The device resource may be a network connection, a cellular connection, a keyboard, a touch interface, an operating system, an application, or some other resource. A system resource may be a software driver, a database, a method of an application programming interface, a port, a wireless communication interface, a secured area in memory or some other resource. The inter-process communication may be provided by any inter-process communication mechanism, such as the Android Binder, Unix Domain Sockets, or shared memory. Prior art, such as Android's permission system for applications, does not provide object firewalls and requires that the receiving object providing access to the system resource enforces its own policies on received inter-process communications.

The policy may state that a request to access a resource should be filtered and/or modified based on one or more criteria. In some embodiments, the policy may state that a request should be filtered based on the source of the request to access the resource. For example, the policy may state that requests to access the resource should be filtered based on the name or type of application making the request. In embodiments, the policy may state that a request should be filtered based on the resource. For example, the policy may state that any requests to use the cellular connection should be filtered. In other embodiments, the policy may state that a request should be filtered based on the requested outcome of or data included in the access. For example, the policy may state that a request to access the network connection to send data to www.google.com should be filtered.

The inter-process control (IPC) path between the objects may be controlled by one or more object-oriented firewalls. In some embodiments, there may be one object firewall per object associated with an application. The object firewalls may implement the policy, for example, by controlling the inter-process communication from one object to a receiving object that provides access to a system resource. In embodiments, controlling access to the resource from an application may be based on a policy, and may comprise filtering access to one or more objects providing access to the resource, wherein said access is through the inter-process control path. Further, in embodiments, said filtering may be based on a policy governing inter-process communications to said one or more objects providing access to the resource. The object firewalls may obtain the policy from the policy engine. The policy may be translated, for example, by a policy engine, into one or more specific settings on a particular object firewall. As new objects are created, the IPC controller may install new object firewalls as needed. The object firewall may respond to a request of a resource in one or more ways, including without limitation, that the object firewall may block the request of the resource, the object firewall may allow the request of the resource, the object firewall may modify the contents of the request, the object firewall may modify the return value of the data sent from the resource, the object firewall may change the resource requested, the object firewall may log the request, the object firewall may ignore the request, the object firewall may change one or more firewall rules, or the object firewall may add or remove object firewall rules. In embodiments, the object firewall may record resource access attempts. The object firewalls may be stored in a centralized registry. Similarly, the objects providing access to the device and system resources may also be stored in a centralized registry.

For security purposes, a single process may be associated with the device security system. In some embodiments, this process may be enabled to control and configure the object firewalls.

In embodiments, a secure computing device may include a device-based context-aware policy engine to enforce polices relating to the provenance of data between an application executing on the computing device and another application computing on the computing device. In some embodiments, the computing device may be a portable computing device, such as a laptop, a cellular phone or a tablet. In some embodiments, one of the applications may be a game, such as Angry Birds, Smash Cops, Words with Friends or some other game. In some embodiments, one of the applications may be a utility, such as the phone application, Skype, a web browser, a music player or some other utility. In some embodiments, one of the applications may be a tool, such as Twitter, ESPN ScoreCenter, Google Translate or some other tool. In an embodiment, the second application may be the operating system.

In embodiments, an authoring tool may be provided for authoring one or more policies by a user. The authoring tool may have a browser-based interface. The authoring tool may have a GUI. The authoring tool may be installed on the device and may be used to control and/or create object firewalls on the device. In embodiments, the authoring tool may be installed on a remote system. Policies authored may be stored in one format (e.g. a set of objects and methods stored in a database), translated to a second format for transmission to a device (e.g. XML), and parsed by a receiving device to determine how to configure one or more object firewalls.

The policy engine may generate system-specific context, which may include one or more of the current date and time, the computing device location, the identity of the device user, which applications are executing on the computing device, which applications are consuming which device resources, and other data related to the context in which the system resides. In some embodiments, the policy engine may be connected to a policy server, which may push one or more policies to the policy engine.

In embodiments, the policy engine may control access to a resource. For example, enforcing policies related to the data provenance between the applications may include evaluating, by the policy engine, a call from the first application to the second application. The policy engine may evaluate the call based on one or more policies, and one or more of the system context, application context and the context of the call. The policies may include, for example, system policies, application policies, and other policies. The policy engine may use the one or more policies to evaluate the call, including, without limitation, whether the source of the data is a trusted source, a permitted source, or the like, and/or whether the nature of the data is of a type permitted to be relayed to or used by the second application. In some embodiments, the policy engine may also determine, based on the evaluation of the call, whether any data to be transferred by way of the call is authorized.

For example, a call from one application to a web browser to transfer a secured contact list may be evaluated by the policy engine on mobile phone. The policy engine may include a policy prohibiting the transmission of any data from the contact list. Upon evaluating the call, the policy engine would reject the call and may report a failure to the first application.

In embodiments, methods of securing a computing device by may include providing a device-based context-aware policy engine to enforce a policy relating to data provenance between a first application executing on the computing device and a second application executing on the computing device; reviewing, by the device-based context-aware policy engine, a data transfer from the first application to the second application; and determining, by the device-based context-aware policy engine based on a policy, whether the data transfer is permitted. In some embodiments, the computing device may be a portable computing device, such as a laptop, a cellular phone or a tablet. In some embodiments, one of the applications may be a game, such as Angry Birds, Smash Cops, Words with Friends or some other game. In some embodiments, one of the applications may be a utility, such as the phone application, Skype, a web browser, a music player or some other utility. In some embodiments, one of the applications may be a tool, such as Twitter, ESPN ScoreCenter, Google Translate or some other tool. In an embodiment, the second application may be the operating system.

A device-based context-aware policy engine may be enabled to identify the device's context and state, and may generate a system-specific context. The system-specific context may include one or more of the current date and time, the computing device location, the identity of the device user, the applications currently executing on the device and other context-related data. In some embodiments, the policy engine may be connected to a policy server, which may push one or more policies to the policy engine.

Enforcing data provenance policies between the applications may include evaluating, by the policy engine, a call from the first application to the second application. The policy engine may evaluate the call based on one or more policies, and one or more of the system context, application context and the context of the call. The policies may include, for example, system policies, application policies, and other policies. The policy engine may use the one or more policies to evaluate the call. In some embodiments, the policy engine, may also determine, based on the evaluation of the call, whether any data to be transferred by way of the call is authorized.

Reviewing a data transfer, by the device-based context-aware policy engine, may include generating a context specific to the received remote procedure call. In some embodiments, the context may include the identity of the first application.

Determining whether the data transfer is permitted may include evaluating the data transfer request subject to one or more available policies. The determination may be based on a comparison of the context against a policy. Such policies may include, for example, a system policy, an application policy, a system context-related policy, an application context-related policy, a policy regarding the content of the requested data transfer, or some other policy.

In embodiments, methods of enforcing distributed policies in mobile networks may include providing an inter-process communications firewall on a device to enforce rules governing communication between two systems and/or subsystems; generating, by a policy engine associated with the inter-process communications firewall, a system context; and determining, by the inter-process communications firewall, whether the communication is permitted. In some embodiments, the determination of whether the communication is permitted by the inter-process communications firewall may be based on one or more of a policy, a system context, and/or the content of the communication.

In some embodiments, the distributed policies may include one or more policies such as a black/white list, a signing and/or naming policy, a checksum/library analysis policy, a permission for one or more of an application, a process, a user, a group of users, and other policies. In some embodiments, the policy may be stored on a policy server connected to the mobile network. The policy may also be stored in a policy engine on the device. A black list may identify one or more prohibited actions. For example, an application black list may comprise a list of application IDs for applications prohibited from executing on the device. A white list may identify one or more allowed actions. For example, an application white list may comprise a list of application ids for applications that are permitted to execute on the device.

The inter-process communications firewall may be an object-oriented firewall related to one or more objects in an application. In some embodiments, the inter-process communications firewall may communicate with an IPC controller to control communications between the object related to the inter-process communications firewall and a second object. The second object may be related to a second application.

In some embodiments, generating a system context by the policy engine may include the current date and time, the device location, identity of the device user or some other context.

In embodiments, a secure computing system may include an operating system adapted to secure the system's processes by filtering the processes using inter-process communications (IPC). The computing system may be a mobile device, such as a cellular phone, an MP3 player, a tablet and a laptop. In some embodiments, the device may be a cellular phone, such as an iPhone, a Motorola Droid Razr Maxx, a HTC One X, a Samsung Focus 2, a Samsung Gusto 2, or some other cellular phone. In other embodiments, the device may be a tablet, such as an iPad, an Asus Eee Pad Transformer Prime, a Sony Tablet S, a Samsung Galaxy Tab 10.1, or some other tablet. Examples of operating systems include, but are not limited to, Android, BlackBerry OS, iOS, Symbian OS, Windows Phone and Chrome OS.

The way in which the filtering of the processes using IPC may be implemented may depend on the particular operating system. In some embodiments, the operating system may use a universal resource identifier (URI) instead of the inter-process communications, for example, in iOS.

In embodiments, a secure computing system may include an operating system adapted to secure the computing system's processes by commanding and controlling processes using inter-process communications (IPC). The computing system may be a mobile device, such as a cellular phone, an MP3 player, a tablet and a laptop. Examples of operating systems include, but are not limited to, Android, BlackBerry OS, iOS, Symbian OS, Windows Phone and Chrome OS. The way in which the filtering of the processes using IPC may be implemented may depend on the particular operating system. In some embodiments, the operating system may use URI instead of the inter-process communications, for example, in iOS.

Using the IPC, the command and control processes may be used to securely control functions of the computing system. For example, the IPC may be used to command and control web browsing, phone calls, text messaging and other computing system functions. In other embodiments, using the IPC, the command and control process may be used to filter inter-process communications. For example, the inter-process communications may be filtered according to a rule or policy to prevent a particular class of applications from sending private data. In another example, the inter-process communications may be filtered according to a rule or policy to prevent a particular class of applications from connecting to any computers outside of a defined network.

In embodiments, methods for enforcing security and access control policies on privileged code execution on a jail-broken mobile device may include calling, by an application, to execute privileged code; determining, by the privileged code policy engine, whether the application may execute the privileged code; and enforcing the determination by the privileged code policy engine. The mobile device may be, for example, a cellular phone, an MP3 player, a tablet and a laptop. Examples of operating systems include, but are not limited to, Android, BlackBerry OS, iOS, Symbian OS, Windows Phone and Chrome OS. The way in which the filtering of the processes using IPC may be implemented may depend on the particular operating system. In some embodiments, the operating system may use URI instead of the inter-process communications, for example, in iOS.

A jail-broken mobile device may be a device where the operating system on the device is broken out of or bypassed so that the user of the device may be able to access files outside of chroot-like restrictions. For example, a user may jailbreak an iPhone to install Cydia, a third party application marketplace alternative to Apple's App Store, which the user would not otherwise be able to do on an iPhone that is not jail-broken.

The privileged code may be code that only may be accessed once permission is granted by a privileged code service. For example, the privileged code may be kernel code. A privilege may be, for example to access and run code in supervisor or administrator mode.

In some embodiments, the application may be a game, such as Angry Birds, Smash Cops, Words with Friends or some other game. In some embodiments, the application may be a utility, such as the phone application, Skype, a web browser, a music player or some other utility. In some embodiments, the application may be a tool, such as Twitter, ESPN ScoreCenter, Google Translate or some other tool.

In some embodiments, the policy engine determines whether a call, by an application, to execute privileged code may be executed. The determination may be based on one or more of the type of application making the call, the name of the application making the call, the location of the application making the call, the system context, the device location, the current date, the current time, the identity of the device user, the type of the privileged code, the content of the call or some other criteria.

Enforcing the determination of the policy engine may include comparing the determination against a policy. The policy engine may enforce the determination based on one or more policies. The policies may include, for example, system policies, application policies, and other policies. The policy engine may use the one or more policies to evaluate the call. In some embodiments, the policy engine, may also determine, based on the evaluation of the call, whether any data to be transferred by way of the call is authorized.

In embodiments, methods for enforcing security and access control policies on privileged code execution on mobile devices may include calling, by an application to a system controller, to execute privileged code; requesting, by the system controller to an inter-process communications controller, for a permission to access the privileged code; requesting, by the system controller to a privileged code policy engine, a determination whether the application is permitted to access the privileged code; determining, by the privileged code policy engine, whether the application may execute the privileged code; and enforcing, by the system controller, the determination by the privileged code policy engine. The mobile device may be, for example, a cellular phone, an MP3 player, a tablet and a laptop. Examples of operating systems include, but are not limited to, Android, BlackBerry OS, iOS, Symbian OS, Windows Phone and Chrome OS. The way in which the filtering of the processes using IPC may be implemented may depend on the particular operating system. In some embodiments, the operating system may use URI instead of the inter-process communications, for example, in iOS.

A jail-broken mobile device may be a device where the operating system on the device is broken out of or bypassed so that the user of the device may be able to access files outside of chroot-like restrictions. For example, a user may jailbreak an iPhone to install Cydia, a third party application marketplace alternative to Apple's App Store.

The privileged code may be code that only may be accessed once permission is granted by a privileged code service. For example, the privileged code may be kernel code. A privilege may be, for example to access and run code in supervisor or administrator mode.

In some embodiments, the application may be a game, such as Angry Birds, Smash Cops, Words with Friends or some other game. In some embodiments, the application may be a utility, such as the phone application, Skype, a web browser, a music player or some other utility. In some embodiments, the application may be a tool, such as Twitter, ESPN ScoreCenter, Google Translate or some other tool.

The system controller, in response to call to execute privileged code from the application, may request permission to access privileged code. In the prior art, the system controller would execute the privileged code in response to the call from the application. However, here, the system controller may request permission to access such privileged code from an inter-process communications controller. The inter-process communications controller, in response to the request from the system controller, may pass the request to a policy engine.

In some embodiments, the policy engine determines whether a call, by an application, to execute privileged code may be executed. In some embodiments, the policy engine may be a privileged code policy engine. The determination may be based on one or more of the type of application making the call, the name of the application making the call, the location of the application making the call, the system context, the device location, the current date, the current time, the identity of the device user, the type of the privileged code, the content of the call or some other criteria.

Enforcing the determination of the policy engine may include comparing the determination against a policy. The policy engine may enforce the determination based on one or more policies. The policies may include, for example, system policies, application policies, and other policies. The policy engine may use the one or more policies to evaluate the call. In some embodiments, the policy engine, may also determine, based on the evaluation of the call, whether any data to be transferred by way of the call is authorized.

In embodiments, methods for protecting against malware in a mobile communications device may include passing a remote procedure call from a first application to a data bus; requesting a policy validation for the remote procedure call from the data bus to a policy engine; determining whether to approve the remote procedure call by the policy engine, based on the context of the remote procedure call and a stored policy; communicating the determination from the policy engine back to the data bus; and either permitting or blocking the remote procedure call by the data bus, based on the determination. The data bus may be an inter-process communications bus. The prior art may have included passing signatures at a file level. However, an aspect of this disclosure is that passing the procedure call may include passing the process signature between the processes rather than at the file level.

In embodiments, methods for using a policy engine to enforce distributed policies on the loading, linking, and execution of native code may include providing an application running inside of a virtual machine on a mobile device; providing a policy engine running on the mobile device; and adapting the rules for loading, linking, and executing code in native libraries in the virtual machine, in response to an input from the policy engine and based on a policy factor.

In some embodiments, the application may run inside a virtual machine. Examples of virtual machines include, but are not limited to, Java Virtual Machines, Perl virtual machines, an Oracle Virtual Machine, a Parallels virtual machine, a Sun xVM, and a VMware virtual machine.

In some embodiments, methods for allowing security policies to be applied to existing APIs may be through aspect-oriented programming and may be applied to existing APIs without modifying the internal logic of APIs. An existing API may be wrapped with one or more layers of security using aspect-oriented programming methods and techniques.

In embodiments, methods for securing a mobile device may include using an inter-process communication to distribute a policy or other data needed to apply aspect-oriented security to a plurality of processes on a mobile device. Security-related data may be distributed via an inter-process communications mechanism, for example an IPC controller, Android Binder, or Unix Domain Sockets, to one or more target processes. Once such security-related data is distributed, aspect-oriented security techniques may be applied to intercept and manage security related to invocations of methods, functions, and services in the target processes.

In some embodiments, methods for securing a device may include using contextual information to alter how policies are applied to the device and consequently how aspect-oriented security techniques are applied across one or more processes. Such contextual information may include geographic, accelerometer, camera, microphone, wireless network, application usage, user interaction, running processes, disk state, nearby wireless signals/networks, pairing state with external devices, websites being visited, device network traffic, battery level, types of data resident on a device, or other device hardware or software detectable context information. Device context may be either real-world, such as geographic location, virtual, such as data resident on the device, applications currently executing, or input/output of data to/from a network or a disk, or arbitrary combinations of the two. For example, a security policy may be triggered by connection to a specific wireless network, the launch of one or more applications, or the downloading of specific datasets.

In some embodiments, methods for securing a device may include tracking which processes are functioning on the device are covered by some form of aspect-oriented security and/or determining processes that are candidates for aspect-oriented security programming. This tracking may be centralized, distributed, or a hybrid combination of the two.

In embodiments, methods securing a device may include storing aspect-related data that may be stored on the device. In some embodiments, the data may be redistributed to processes when the device is turned back on. A non-volatile storage system may capture the needed policy and/or aspect-oriented programming information. When the device is powered on, either a distributed or centralized mechanism may be used for input/output of policy and/or aspect-oriented programming data into processes to enforce security policies.

In embodiments, methods for securing a device may include combining non aspect-oriented programming logic may be coupled with aspect-oriented programming to bring a device to a desired state. In some embodiments, securing the device may include securing specific device functions. For example, non aspect-oriented programming logic may turn off wireless network access before an aspect-oriented programming technique is used to restrict which applications may turn wireless network access on or off. In another example, non aspect-oriented programming logic can automatically shut down a malware application before an aspect-oriented programming technique is used to prevent relaunch of the malware.

In embodiments, methods for securing a device may include adapting an IPC mechanism so that a request over an IPC bus from an application in a normal zone for another application or service may be automatically redirected to a trusted version of the requested application or service.

In embodiments, methods for authenticating an unspoofable context on a device by providing a context detection engine on a server that verifies the context on the device and, in response to the verification, provides access to secure data. In embodiments, the server may be a gateway server to a network.

In embodiments, methods for composing a policy may include combining a plurality of policies from one or more sources to provide a single, coherent policy for a policy engine by reconciling any inconsistent rules. A policy may be a security policy. The plurality of policies may be comprised of, for example, a phone policy, an IT administrator policy, a cellphone carrier policy, an enterprise policy, a department policy or some other policy. The sources of policies may include, for example, a cellphone carrier, a government, a device provider, a device support provider, a device user, the enterprise who supplied the device to the user or some other policy provider. Reconciling inconsistent rules may include comparing two or more rules and selecting the most restrictive rule. Reconciling inconsistent rules may, in some embodiments, include comparing two or more rules and selecting the least restrictive rule. Reconciling inconsistent rules may, in some embodiments, include comparing two or more rules and selecting one of the rules based on some other set of rules, for example, based on to what resource(s) the inconsistent rules apply.

Methods and systems for securing a device are depicted in FIG. 1. The methods and systems depicted in FIG. 1 may include a mobile device system 102. The system 102 may be a cellular phone, such as an iPhone, a Motorola Droid Razr Maxx, a HTC One X, a Samsung Focus 2, a Samsung Gusto 2, or some other cellular phone. In other embodiments, the system 102 may be a tablet, such as an iPad, an Asus Eee Pad Transformer Prime, a Sony Tablet S, a Samsung Galaxy Tab 10.1, or some other tablet. The system 102 may include software executing on the system 102, such as one or more applications 110, one or more virtual machines 112, one or more native libraries 114, an operating system 116, a policy engine 118, one or more object firewalls 144, and one or more IPC controllers 138.

One or more applications 110 may execute locally on the system 102. In some embodiments, the application 110 may be a game, such as Angry Birds, Smash Cops, Words with Friends or some other game. In some embodiments, the application may be a utility, such as the phone application, Skype, a web browser, a music player or some other utility. In some embodiments, the application may be a tool, such as Twitter, ESPN ScoreCenter, Google Translate or some other tool. The application 110 may be downloaded to the system from a legitimate market place, for example iTunes. However, in some cases, the application 110 may be obtained from a malware system 108. In some other cases, the application 110 may be made available from a malware system 108 via a legitimate market place. In embodiments, the application may attempt to execute one or more of privileged code (e.g. code that only may be accessed once permission is granted by a privileged code service 140), code in a trusted code zone 146, or code protected by an object firewall 144.

In embodiments, one or more applications 110 may execute in one or more virtual machines 112. Examples of virtual machines include, but are not limited to, Java Virtual Machines, Perl virtual machines, an Oracle Virtual Machine, a Parallels virtual machine, a Sun xVM, and a VMware virtual machine. To load, link, and execute code in native libraries 114, an application 110 may send a library request to the respective virtual machine 112. The virtual machine 112 may communicate with the policy engine 118 to determine if the request is allowed. In some embodiments, the virtual machine 112 may also use a local policy to determine if the request is allowed. If the request is allowed, the virtual machine 112 facilitates application 110 access to the native library 114, which facilitate interacting with an operating system 116. The virtual machines 112 may signal library access allowance, such as to a native library 114, to the applications 110.

The native library 114 may facilitate an interaction between an application 110 and an operating system 116. The operating system 116 of the system 102 is the software that manages the system 102. Examples of operating systems include, but are not limited to, Android, BlackBerry OS, iOS, Symbian OS, Windows Phone and Chrome OS.

The policy engine 118 may enforce policies, for example, on the loading, linking, and execution of code by an application 110, and on remote procedure calls. The policy engine 118 may also generate system-specific context, which may include the current date and time, the device location, and identity of the device user. In some embodiments, the policy engine 118 may enforce a distributed policy on the loading, linking, and execution of native code by an application 110 running inside of a virtual machine 112. In embodiments, the policy engine 118 may be resident in a second process, and dynamically send and adapt one or more rules for loading, linking, and executing code in one or more native libraries 114. Having the policy engine in a second process that is resident on the same system 102 as a first process, may provide higher speed communication to transfer policies to the virtual machine 112 processes, allowing the policies 130 to be dynamically changed based on a number of policy factors. The second process, in which the policy engine 118 may be resident, may isolate the policy engine 118 from attack, allow it to access external services that might not be accessible from the first process, and may allow the policy engine 118 to be resident in memory both before and after the execution of the first process.

In the context of a remote procedure call, the policy engine 118 may approve or disapprove the transaction and may communicate this result back to a data bus. If this remote procedure call involves a system service, the data bus may pass the request to the operating system 116. The operating system 116 may execute the remote procedure call and return the result to the source application 110 via the data bus. If instead this remote procedure call involves an interaction with another application 110, the data bus may pass the call to the destination application 110. The result of that remote procedure call may then be returned via the data bus to the source application 110.

The system 102 may be connected to a policy server 106 through the cloud or other networking 104. The policy server 106 may manage a policy repository. The policy server 106 may serve policies upon request from the policy engine 118. The policy server 106 may serve such policies by performing a policy repository access to determine policy aspects such as black/white lists 120, signing and/or naming 122, checksum/library analyses 124, permissions for applications, processes, users, groups, and other policy checks 128. The policy server 106 may receive policy repository responses and provide a policy request response to the policy engine 118. Alternatively, the policy engine 118 may serve virtual machines 112 inquiries regarding application 110 access of native libraries 114 based on policy information known to or accessible by the policy engine 118.

The application 110 may include one or more objects that are capable of inter-process communication. In the prior art, these objects were connected directly to the IPC bus 132. Here, the objects may be mediated using object firewalls 144 and IPC controllers 138 A and/or B. Here, each object may have an independent object firewall 144 that may connect to an IPC controller 138 A and/or B. An IPC controller 138 A and/or B may connect to the IPC bus 132. The policy engine 118 may communicate with the object firewall 144 and the IPC controllers 138A and 138B to implement one or more policies 130. In some embodiments, the policy engine 118 may translate a high-level firewall rule into a specific setting on one or more object firewalls 144. As new inter-process communication capable objects are created, the IPC controller 138 A and/or B in each process may install additional object firewalls 144 as needed.

In embodiments, the IPC controller 138A may manage the installation and removal of object firewalls 144 as new inter-process communication capable objects are created and destroyed. This controller may eliminate the overhead of performing additional inter-process communications with an IPC controller 138B in another process on each object creation and may improve performance. The IPC controller 138 may send an IPC call from one inter-process communication capable object to a second inter-process communication capable object's object firewall 144. The second inter-process communication capable object's object firewall 144 may determine, based on a policy 130 implemented as object firewall rules, whether to authorize the call.

The IPC bus 132 may be a data bus. In some embodiments, the IPC bus 132 may enable inter-process communications. In embodiments, the IPC bus 132 may perform inter-process communications via a shared data bus instantiated as a remote procedure call service, protocol handler system call table, or any other function or object broker. For example, the IPC bus 132 may enable inter-process communications as a remote procedure call from an IPC controller 138A associated with an object in one application 110 to another object firewall 144 associated with an object in a second application.

In embodiments, a trusted code zone 146 may exist on the system 102 as a zone of a processor and one or more of the system's 102 specialized debugging interfaces and/or remote auditing tools (e.g. Android™ ADB) may be placed in the trusted code zone 146. A trusted zone of a processor may ensure through a cryptographic chain of trust that code executing within it has not been tampered with. Once an element is placed within the trusted processor zone for execution, the output from operations performed on it may be considered tamper-free, correct, and trusted. An example of commercial software providing trusted zone functionality is TrustZone™ by ARM Limited.

By placing the entire specialized debugging interface and/or tools into the trusted code zone 146, a remote computer can be used to audit the integrity of the system 102 or to securely control the system's 102 execution or configuration with confidence that commands provided remotely are being handled by the correct and trusted debugging software on the system 102. Alternatively, parts of these specialized debugging elements may be placed into the trusted code zone 146 (e.g. file system components and USB I/O components).

In embodiments, the system's 102 inter-process communication mechanism may be placed into the trusted code zone 146. Such an inter-process communication mechanism is intended to govern communication between user-space applications (e.g. not in the operating system) and services (e.g. including system services running in user-space) on the system 102. The inter-process communication mechanism may be, for example, an object firewall 144, an IPC controller 138 A and/or B, or some other inter-process communication mechanism. Once the inter-process communication mechanism is placed into the trusted processor zone, the control of the communication between the user-space applications and services on the device may be considered protected because the software executing in the trusted zone will be tamper-free. Moreover, an inter-process communication mechanism that is secured by a trust zone may be used as a supplemental security control point on the device by intercepting, inspecting, blocking, filtering, or otherwise adapting communications between user-space applications and services. Because the inter-process communication mechanism is within the trusted processor zone, it may be considered a secure point of control over inter-application/service communication.

A system controller 134 may execute a system call 136 in response to a request from an application 110. In embodiments, the system controller 134 may be adapted to send a request to the IPC controller 138 A and/or B, in response to a request from the application 110. By establishing a security policy verification path between the system controller 134 and the IPC subsystem via the IPC controller 138 A and/or B, the system controller 134 may directly verify security permissions via a path that is distinct from the caller application (e.g. based on a query to a policy engine 118). Therefore the query and its result cannot be influenced or manipulated by the caller application or any other application type code. The security of the IPC process itself may further ensure independence of the security permissions query.

In embodiments, an application 110 seeking to execute a privileged code service 140 may attempt to make such a privileged code service 140 execution attempt by interfacing with the system controller 134. Rather than simply allowing execution of the code, the system controller 134 may send a request to an IPC controller 138A which may request over an IPC bus 132 to a system service IPC controller 138B for a system service that governs access control for privileged code service execution 140. This service may make an access decision request of the privileged code policy engine 118 to facilitate determining whether the originating application is authorized to execute the requested privileged code. This determination may be made based on a variety of factors, to include without limitation the identity of the calling application, the identity of the device user, the time of day, the physical location of the device, the current device configuration, and the like. An indication of the result of the system call policy determination may then be returned via the IPC controllers 138A and 138B as connected by the IPC bus 132 to the system controller 134, which then may enforce the determination and may either allow or disallow the execution of privileged code service 140. Regardless of the policy determination, information about the execution attempt, conditions used in making the determination, and resulting action may be logged for use by the user and device administrator.

A malware system 108 may attempt to compromise the security on the system 102. The malware system 108 may connect to the system 102 through the cloud or other networking 104. The malware system 108 may communicate malicious software to the system 102. The malicious software may be a computer virus, a worm, a Trojan horse, spyware, adware, a rootkit, or some other malicious program or script. The malicious software may be communicated to the system 102 via an email, a webpage, an application 110, a text message, a SIM card, or in some other fashion.

Networking 104 may communicate via cloud-based networking. In one embodiment, networking 104 may communicate via cloud-based networking via a network, such as, but not limited to the Internet, an intranet, a personal area network, a VPN, a local area network, a wide area network, a metropolitan area network, or some other network.

One of the advantages of the present invention includes, without limitation, the fact that the calling application need not be aware of the security policy infrastructure that is responsible for making these decisions about access control. In particular, the execution environment in which the application is operating can be instrumented to support these features in a way that is transparent to the application developer. This allows for seamless backward compatibility with existing apps that operate using jailbreak tools and no need for development of future application programmer interfaces for new applications that leverage this infrastructure.

One mechanism of using a trusted processor zone to improve mobile device security may be to place a device's specialized debugging interfaces and/or remote auditing tools, such as Android™ ADB, into the trusted zone. These debugging interfaces and tools may provide mechanisms via USB, wireless, or other wired communication to audit, configure, or control one or more of the processes, file systems, applications, and other components of a mobile device. By placing the entire specialized debugging interface and/or tools into the trustzone, a remote computer may be used to audit the integrity of a device or securely control its execution or configuration with confidence that commands provided remotely are being handled by the correct and trusted debugging software on the device. Alternatively, parts of these specialized debugging elements may be placed into the trustzone (e.g. file system components and USB I/O components).

Another mechanism for using a trusted processor zone to improve mobile device security may be to place the device's inter-process communication mechanism into the trusted zone. Such an inter-process communication mechanism is intended to govern communication between user-space applications (e.g. not in the operating system) and services (e.g. including system services running in user-space) on a mobile device. Once the inter-process communication mechanism is placed into the trusted processor zone, the control of the communication between the user-space applications and services on the device may be considered protected because the software executing in the trusted zone will be tamper-free. Moreover, an inter-process communication mechanism that is secured by a trust zone may be used as a supplemental security control point on the device by intercepting, inspecting, blocking, filtering, or otherwise adapting communications between user-space applications and services. Because the inter-process communication mechanism is within the trusted processor zone, it may be considered a secure point of control over inter-application/service communication.

Secure processes with enhanced permissions, such as daemon user-space processes, may be used to spawn and control the execution of other processes on a device. For example, on Android™, the Zygote is responsible for launching and adapting the permissions of the processes for applications. In embodiments, these secure daemons may be moved inside of a trusted processor zone to ensure that they cannot be tampered with to launch, configure, or control other processes maliciously. Further, when a secure daemon is moved within a trusted processor zone along with a secure inter-process communication mechanism, other user-space processes may securely interact with this daemon process.

User-space application permissions, code, and configuration are typically managed by a package manager on a mobile device. The package manager installs, configures, uninstalls, and responds to queries regarding application artifacts, configuration, and permissions. If the package manager on a mobile device is compromised, an attacker can use the package manager to falsely report application permissions, configuration settings, code locations, or other critical parameters. In embodiments, this may allow the package manager to be moved inside of the trusted processor zone in order to ensure that package manager and all of its functions (e.g. package installation, configuration, uninstallation, application info querying, and the like) are not tampered with. By moving a package manager (e.g. Android Package Manager service, and the like) into the trusted processor zone, these critical application packaging services may be protected.

Virtual machines, such as the Dalvik Virtual Machine™, are used to execute code on mobile devices. Since virtual machines control execution of key application code, if they are tampered with, severe security holes can be opened that allow applications to run arbitrary code. By moving the entire virtual machine into the trusted processor zone, the device may ensure that virtual machine execution is not compromised. Likewise, even if core parts of the Dalvik Virtual Machine™, such as instruction dispatching, virtual dispatch tables, socket and I/O code, file system interaction code, class bytecode caches, symbol tables, or class loading mechanisms are moved to a trusted zone, one may ensure that these critical components are not compromised.

Many configuration functions on a mobile device operate via reading XML, querying a relational database (e.g. SQLite), or loading other configuration files and then changing system execution parameters. For example, XML or Java bytecode files (e.g. Android Manifest.dex/class/java/xml) may be used to store mappings of application user IDs to Linux user IDs and permission groups. By moving the I/O, reading, and interpretation of these configuration data sources into the trusted processor zone, the mobile device may ensure that these information sources are properly checked cryptographically for provenance and integrity, read and interpreted properly, and not altered to incorrectly perform their function. Relational database components, configuration loading routines (e.g. Android LayoutInflater, Manifest reader, and the like) may be moved into the trust zone as needed to protect these core functions.

Enterprises use mobile device management systems to control policies governing the usage/security of mobile devices. If a mobile device management system is compromised, an attacker may use these mobile device management systems to steal sensitive data or perform other nefarious actions. By moving one or more parts of the mobile device management system inside of the trusted processor zone one may ensure that they are not compromised. Once inside of the trusted processor zone, these mobile device management functions may be considered secure and not exploitable by attackers.

User input on a device may leverage a touch screen software component to receive touch events from the hardware; translate these events to movement, key presses, or other user input; dispatch the events through shared memory or inter-process communication to a target process; and deliver the events to application software components. If these touch screen software components are tampered with, they can be used as an attack vector to siphon off pin numbers, banking information, and other secure credentials. The trusted zone methods and systems described herein may counteract this threat on mobile devices by moving one or more parts of the software touch screen event dispatching, shared memory reading/writing, inter-process communication dispatch, and intra-application dispatch code into the trusted processor zone. Moreover, the parts moved into the trusted processor zone may include a software input method, such as code for controlling a virtual on-screen keyboard and/or its configuration data, into the trusted processor zone.

A geo-localization, proximity detection, position estimation, or proximity authentication component can be used to determine or validate a device's location. However, these mechanisms can be attacked and/or the result spoofed to make applications on a device detect a different location that the actual location of the device. This may be used to circumvent location-based policies or attack systems that rely on precise localization (e.g. car navigation). To thwart this possible exploit vector, one or more of these systems may be moved into a trusted processor zone to prevent tampering.

While examples of use of a trust zone for enhancing mobile device software and data security have been described herein, there may be other beneficial uses of a trust zone in addition to these examples that are contemplated and therefore included herein. In addition, while TrustZone by ARM Limited uses as an example trust zone facility, any facility that provides a trust zone with robust protection of software and/or data through cryptographic or other tamper-proof means may be used with the methods, systems, and applications described herein.

In embodiments, a plurality of applications may interactively execute inside of a plurality of virtual machines. To load, link, and execute code in native libraries, the applications may send library requests to their respective virtual machines. The virtual machines may communicate with the policy engine to determine if the request should be allowed. The virtual machine may also use a local policy to determine if the request is allowed. If the request is allowed, the virtual machine facilitates application access to the native libraries that facilitate interacting with an operating system. The virtual machines may signal library access allowance to the applications.

The policy engine may optionally exchange policy requests with a policy server that may manage a policy repository. The policy server may serve policy requests from the policy engine by performing a policy repository access to determine policy aspects such as black/white lists, signing and/or naming, checksum/library analyses, permissions for applications, processes, users, groups, and other policy checks. The policy server may receive policy repository responses and itself provide a policy request response to the policy engine. Alternatively, the policy engine may serve virtual machines inquiries regarding application access of native libraries based on policy information known to or accessible by the policy engine.

In an embodiment, the virtual machines may communicate with a policy engine using local cross-process communication mechanisms, such as IPC, Unix domain sockets, or shared memory. The cross-process communication mechanisms may be used to either send information about native library requests received by the virtual machine from the applications to the policy engine for approval, or to receive policy or rule data in order to make local approval decisions. In embodiments, the cross-process communication mechanisms may be used to send native library request from the applications to the policy engine.

Figure 2:
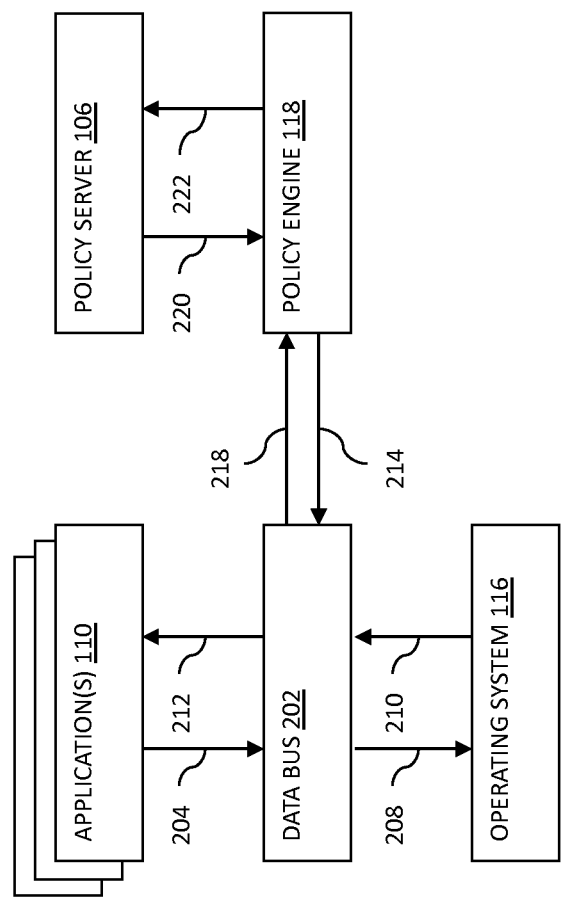
FIG. 2 depicts a system with a policy engine.

Referring now to FIG. 2, a plurality of applications 110 may interact with each other and system services via a common data bus 202. To communicate between subsystems, the source application may execute a remote procedure call 204 and this request may then be passed to the data bus 202. The data bus may then request a policy validation for the remote procedure call by passing that call 218 to the policy engine 118. Using the context of the remote procedure call and its stored policy, the policy engine 118 may either approve or disapprove the transaction and communicates this result 214 back to the data bus 202. If this remote procedure call involves a system service, the data bus may pass the request 208 to the operating system 116. The operating system 116 may execute the remote procedure call and return the result 210 via the data bus 202 to the source application 110. If instead this remote procedure call involves interaction with another application, the data bus may pass the call 212 to the destination application 110. The result of that remote procedure call may be returned via the data bus 202 to the source application 110.

In more detail, still referring to FIG. 2, the data bus 202 may be responsible for generating context specific to the received remote procedure call, to include the identity of the source application 110. The policy engine 118 may be responsible for generating system-specific context to include the current date and time, the device location, and identity of the device user. The policy engine 118 then may evaluate the remote procedure call subject to the available system policies, application policies, system context, application context, and content of the remote procedure call itself. Based on the outcome of the policy evaluation, the policy engine 118 then may return a response via data bus 202 to the source application 110.

In more detail, still referring to the invention in FIG. 2, the system may be supported via an optional policy server 106. This server may be remotely located and accessed via the device's network connection. Policy administrators may input system and application policies into the policy server 106. The policy server then may push 220 these polices to the policy engines 118 of devices they administer. The policy engine 118 may also report 222 policy statistics and violations to the policy server 106 for the purpose of auditing and accounting.

In embodiments, applications 110 may be modularly installed on a smart phone and able to perform inter-process communication via the shared data bus 202 which may be instantiated as a remote procedure call service, protocol handler, system call table, or any other function or object broker. The policy engine 118 may be instantiated as extensions to this broker service whereby inter-process communications requests may be evaluated against the available policies. These requests may either be approved or denied based on the outcome of the policy evaluation.

Figure 3:
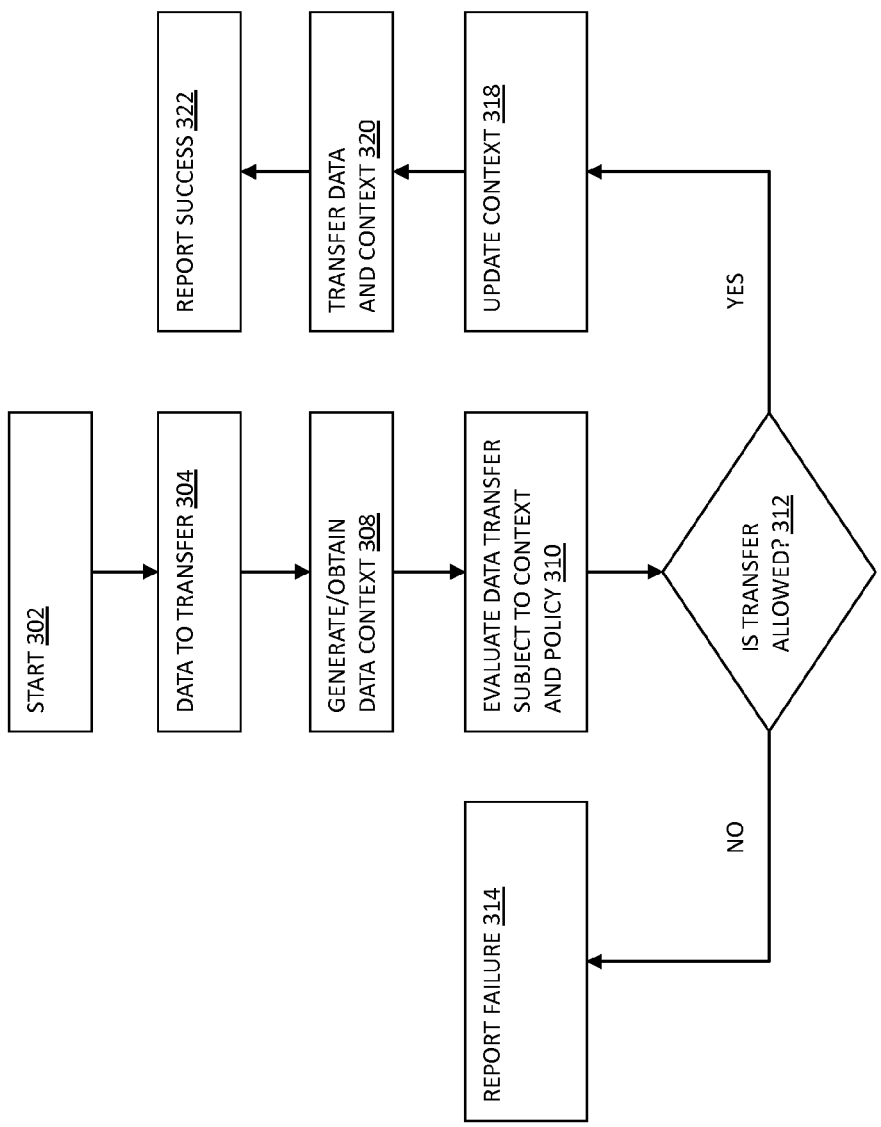
FIG. 3 depicts a method for determining whether a data transfer between applications may be allowed.

Turning now to FIG. 3, the system operation may begin 302. A user, application, or service may determine a data transfer between applications should occur and the data source may obtain and prepare that data 304. The data transfer service may either obtain or generate the relevant context associated with the data transfer 308, such as the sensitivity of the data or origin of the data. The data and its context may be then evaluated subject to a plurality of policies 310 to determine whether or not the transfer is authorized 312. If not authorized, the data transfer service may report failure 314 to the user, application, or service that initiated the transfer. If authorized, the data context may be updated 318 to include any relevant context changes that are a consequence of the transfer. The data may then be transferred to the destination 320 and success may be reported 322 to the user, application, or service that initiated the transfer.

Data transfer authorization may be obtained by ensuring proper data context is obtained 308 and maintained after the transfer 320. Policies used to evaluate whether the transfer is authorized 312 may use the data, the data's context, and the overall system's context to make authorization decisions. Embodiments of this process may ensure that sensitive data is not transferred to an application that is not authorized to receive that data, and/or that data is only transferred between applications and/or individuals that are authorized to send and receive information between each other.

A specific instantiation of this process may be shown in FIG. 2. An application 110 may request information from another application or service. This data may be received by the data bus 202, which may transfer it 218 to the policy engine 118 where it may undergo policy evaluation. A determination may be made by the policy engine 118 and may be returned 214 to the data bus 202. If the transfer is not authorized, the data bus may report 212 failure to the requesting application 110. If the transfer is authorized, the data bus may update the data context and transfer 212 the data and context to the destination application. Success may be reported.

The advantages of embodiments include, without limitation, the ability to enforce rigorous, detailed security policies on all remote procedure calls, inter-process communication, and system calls that occur on mobile devices. By implementing a system-wide policy engine, device administrators may deploy policies that allow applications can more easily protect themselves against other potentially malicious applications. When applied to data provenance, the movement of all data within a mobile device can be authorized based on parameters such as the source, destination, and sensitivity of the data. This provides significant advantages over prior art that relied on applications to individually approve/disapprove individual transactions without a common policy set.

Figure 5:
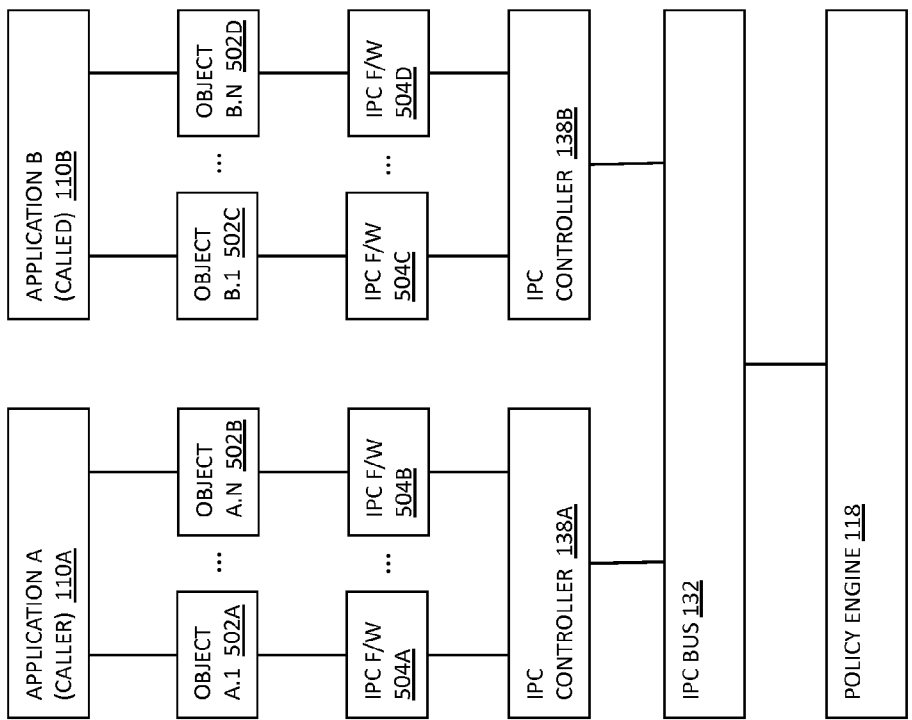
FIG. 5 depicts a system with a plurality of object firewalls.

Referring now to FIG. 5, applications 110 A and/or B may contain a collection of objects 502 A-D that are capable of inter-process communication. These objects may connect directly to the IPC bus 132, however in embodiments, they may be mediated using firewalls 504 A, B, C, and/or D and/or controllers 138 A and/or B. Specifically each object (e.g. 502A) may have an independent IPC firewall 504A which may connect to an IPC controller 138A that connects it to the IPC bus 132. A policy engine 118 may communicate with the controllers and firewalls to implement device policies.

The policy engine 118 may translate high-level firewall rules into specific settings of a plurality of IPC object firewalls 504 A-D. In embodiments, as new IPC-capable objects 502 A, B, C, and/or D are created, the local IPC controller 138 A and/or B in each process may install one or more IPC object firewalls 504 A-D into the IPC-capable objects 502 A-D as needed.

An application 110 A may initiate an inter-process communication call from an object (e.g. 502 A) to a second object (e.g. 502 D) in a second application 110 B. Optionally, an IPC object firewall 504A on the first application may determine if the outbound IPC call is allowed based on the current IPC firewall rules. The inter-process communication call may be sent to the second application 110 B IPC controller 138 B via the IPC bus 132. The IPC controller 138 B may send the IPC call onto the second object's IPC firewall 504 D. The second object's IPC firewall 504 D may make an access determination based on the IPC firewall rules, the target object 502 D of the call, the data provided with the call, the current state of the target object 502 D, and the current state of the target application 110 B.

The processing of the IPC call by the IPC firewall 504 D of the target object 502 D of the target application 110 B may involve any of the following. The target object IPC firewall 504 D may block the IPC call to the target object 502 D. The target object IPC firewall 504 D may modify the contents of the data sent with the call to the target object 502 D. The target object IPC firewall 504 D may modify the return value of the data sent from the target object 502 D to the initiating object 502 A in response to the inter-process communication call. The target object IPC firewall 504 D may change the target object 502 D of an IPC call. The target object IPC firewall 504 D may log the call. The target object IPC firewall 504 D may change one or more IPC firewall rules or add/remove IPC firewall rules.

When the IPC call returns to the initiating object 502 A, the initiating object's IPC firewall 504 A may determine, based on one or more of the IPC firewall rules, the target object of the call, the data provided with the call, the data provided in the return value of the call, the current state of the initiating object 502 A, and the current state of the initiating application 110 A, how to process the IPC call. The processing may include any one or more of the following: the initiating object 502 A may throw an exception rather than proceeding; the initiating object firewall 504 A may modify the return value of the IPC call; the initiating object firewall 504 A may send additional IPC calls to the initiating object 502 A or other objects (e.g. 502B); the initiating object firewall 504 A may modify one or more IPC firewall rules or adding/removing IPC Firewall rules.

The advantage of present embodiments may include, without limitation, the ability to enforce rigorous, detailed security policies on all IPCs that occur on mobile devices. By implementing a system-wide policy engine, device administrators may deploy policies that allow applications to more easily protect themselves against other potentially malicious applications. When implemented as an IPC firewall, the invention may achieve policy enforcement in an efficient, scalable way that may enforce a broad range of system policies.

Figure 4:
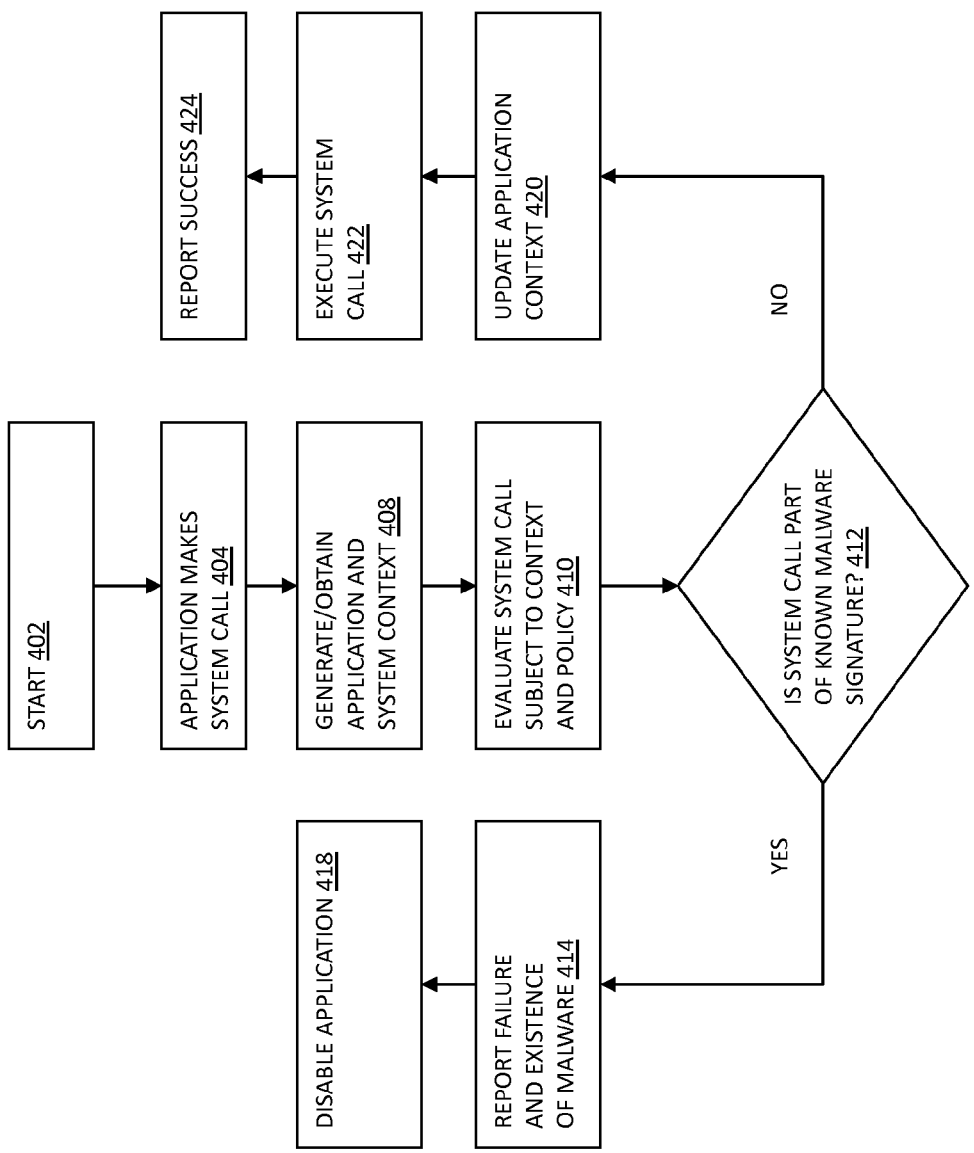
FIG. 4 depicts a method for determining whether a system call should occur.

In embodiments, referring now to FIG. 4, an embodiment of system operation for addressing malware threats begins 402. An application may determine a system call should occur and the application makes the system call 404. The call handler may either obtain or generate the relevant context associated with the application 408, such as the source of the application, publisher, or intended purpose. The system call and its context may then be evaluated subject to a plurality of policies 410 to determine whether or not the system call is part of known malware signature 412. If part of a known malware signature, or not authorized, the call handler may report failure to the application, the presence of malware to the device administrator 414, and may disable the application 418. If authorized, or not part of known malware signature, the application context may be updated 420 to include any relevant context changes that are a consequence of the system call. The system call may then be executed 422 and success may be reported 424 to the application.

The system call authorization may be obtained by ensuring proper application context is obtained 408 and updated 420 after the transfer. Policies used to evaluate whether the system call is authorized 410 may use the call, the application's context, and the overall system's context to make authorization decisions. Various embodiments may allow device administrators to push policies to devices that can identify and disable malware based on known system call patterns and application context.

A specific instantiation of this process may be shown in FIG. 2. An application 110 may request execution of a system call. This call may be received by the data bus 202, which may transfer it 218 to the policy engine 118 where it can undergo policy evaluation. A determination may be made by the policy engine 118 and returned 214 to the data bus 202. If the system call is not authorized, the data bus 202 may report 212 failure to the requesting application 110. If the system call is authorized, the data bus 202 may update the application context, execute 212 the system call, and update the application context. Success may be reported.

The advantages of the present embodiments may include, without limitation, is the ability to enforce rigorous, detailed security policies on all remote procedure calls, inter-process communication, and system calls that occur on mobile devices. By implementing a system-wide policy engine, device administrators can deploy policies that allow applications can more easily protect themselves against other potentially malicious applications. When applied to malware detection and prevention, known system call patterns can be recognized, intercepted, and stopped prior to execution. Offending applications can then be disabled and device administrators notified of the malicious activity. This provides significant advantages over prior art that relied on applications to individually approve/disapprove individual system calls without a common policy set. Additionally, it allows device administrators to implement device policies that protect against emerging threats without needing to wait for a vendor-supplied patch to become available.

A further aspect discussed herein is the use of inter-process communication to distribute policy or other data needed to apply aspect-oriented security to a plurality of processes on a mobile device.

A challenge with existing mobile security solutions is that they require modifications to the application programming interfaces, system libraries, or operating system in order to enforce security policies. For example, in order to restrict access to wireless networks or cutting/pasting of data, the APIs related to these features must be modified to allow security policies to change their behavior. For rapidly developing mobile systems, modifying the APIs of the platform to support security features and maintain them requires substantial effort.

Embodiments may address mobile device security issues by allowing security policies to be applied to existing APIs through aspect-oriented programming and applied to existing APIs without modifying the internal logic of APIs. Instead, an existing API may be wrapped with one or more layers of security using the aspect-oriented programming methods and techniques described herein. Although aspect-oriented programming has been used to apply security policies to a single process in non-mobile operating environments, mobile devices, however, use a multi-process architecture and inter-process communication to operate. Therefore, single-process application of security policies may not satisfy mobile device operating security requirements. Inter-process communications may be used to distribute one or more policies or other data needed to apply aspect-oriented security to a plurality of processes on a mobile device. Once the security-related data is distributed via an inter-process communication mechanism, such as the Android Binder or Unix Domain Sockets, to the target processes, aspect-oriented security techniques may be applied to intercept and manage security related to invocations of methods, functions, and services in these target processes.

Aspect-oriented programming may manifest in numerous forms on mobile platforms. An aspect-oriented programming approach may be a modification to an object class to invoke a specific segment of code before, after, in place of, or any combination of these in relation to an object-oriented method execution. An aspect-oriented programming approach may include: a Java Dynamic Proxy; an interceptor applied to a method, service, system, or other function call; a modification of the loading of classes into a virtual machine to change their default behavior; a binary code patch, such as Java JAR or Android DEX files; modification to a method dispatch table to alter code execution for specific functions or methods; and other suitable approaches.

In various embodiments, the ability to use contextual information to alter how policies are applied to the device and consequently how aspect-oriented security techniques are applied across one or more processes may be provided. Such contextual information may include geographic, accelerometer, camera, microphone, wireless network, application usage, user interaction, running processes, disk state, nearby wireless signals/networks, pairing state with external devices, websites being visited, device network traffic, battery level, types of data resident on a device, or other device hardware or software detectable context information. Device context may be either real-world, such as geographic location, virtual, such as data resident on the device, applications currently executing, or input/output of data to/from network or disk, or arbitrary combinations of the two. For example, a security policy may be triggered by connection to a specific wireless network, the launch of one or more applications, or the downloading of specific datasets.

Aspect-oriented security for mobile devices may include tracking which processes that are functioning on the device are covered by some form of aspect-oriented security and/or determining processes that are candidates for aspect-oriented security programming being applied, such as to enforce a security policy. This tracking may be centralized, distributed, or a hybrid combination of the two.

A mechanism for such tracking may determine how to distribute policy and/or aspect-oriented programming data to processes in order to apply security policies to a set of desired functions or device capabilities. Such a mechanism may either reside in the operating system or outside of the operating system in user space.

Since devices may be shut down and restarted, policy and/or aspect-related data may be stored on the device so that it can be redistributed to processes when a device is turned back on. A non-volatile storage system may capture the needed policy and/or aspect-oriented programming information. When a device is powered on, either a distributed or centralized mechanism may be used for input/output of policy and/or aspect-oriented programming data into processes to enforce security policies.

Security policies may encompass restrictions on the execution of application, operating system, middleware, or other code. A security policy may include restrictions on how the user may interact with the system, what operations they may perform, what data they can access, how they can use data, and the like. A security policy may also govern input/output or other operations related to physical hardware.

Additionally, non aspect-oriented programming logic may be coupled with aspect-oriented programming to bring a device to a desired state before securing specific device functions or capabilities. For example, non aspect-oriented programming logic may turn off wireless network access before an aspect-oriented programming technique is used to restrict which apps can turn wireless network access on/off. In another example, non aspect-oriented programming logic can automatically shut down a malware application before an aspect-oriented programming technique is used to prevent re-launch of the malware.

While only a few embodiments of the present invention have been shown and described, it will be obvious to those skilled in the art that many changes and modifications may be made thereunto without departing from the spirit and scope of the present invention as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

All documents referenced herein are hereby incorporated by reference.

What is claimed is:

1. A method of filtering access to a resource in a device, the method comprising:
   using a computer processor, controlling access to the resource from an application based upon a policy, comprising:
   providing the policy to an object firewall;
   translating the policy into one or more settings for the object firewall;
   filtering, via the object firewall in the device, inter-process communications access to a first object from a second object associated with the application, wherein the first object provides access to the resource through one or more inter-process control paths, wherein the object firewall is configured via the policy to govern interprocess communications to the first object, wherein the object firewall is the only object firewall for the first object, and wherein the object firewall is not an object firewall for any object other than the first object; and
   wherein controlling access to the resource comprises at least one of permitting and blocking access to the resource in response to the policy, wherein at least one of permitting and blocking access to the resource further comprises at least one of permitting the inter-process communications without modification, permitting the inter-process communications with modified contents of the inter-process communications, permitting the inter-process communications with a modified return value of data sent from a resource in response to the inter-process communications, blocking the inter-process communications, logging the inter-process communications, ignoring the inter-process communications, modifying one or more firewall rules, adding one or more firewall policies, and removing one or more firewall policies.

2. The method of claim 1, further comprising, using the computer processor, generating a device-based context based on one or more of a current date and time, a current location of the device, an identity of a current user of the device, an identity of each application currently executing on the device, and an identity of each resource currently in use.

3. The method of claim 1, further comprising controlling access to the resource from the second object based upon a policy by providing a context aware policy engine to control access to the resource, wherein the second object is associated with the application attempting to access the resource.

4. The method of claim 3, wherein the context-aware policy engine is further enabled to communicate with a policy server to communicate one or more policies.

5. The method of claim 1, wherein the policy governing the interprocess communication to the first object is a context-related policy.

6. The method of claim 1, wherein the resource is one of a network connection, a cellular connection, a keyboard, a touch interface, an operating system, an application, a part of an application programming interface, a software driver, a database, a port, a wireless communication interface, and a secured area in memory.

7. The method of claim 1, wherein the object firewall is stored in a centralized object registry.

8. The method of claim 1, wherein the first object providing access to the resource is stored in a centralized registry.

9. The method of claim 1, further comprising providing a browser-based interface to author policies that, when installed on the device, control or create the object firewall.

10. The method of claim 1, wherein the policy is authored using a graphical user interface, stored in a first format, translated into a second format for transmission to a device, and parsed by a receiving device in order to determine how to configure the object firewall.

11. The method of claim 1, further comprising, using the computer processor, controlling and configuring the object firewall in a single process associated with a device security system.

12. A system of enforcing distributed policies in a mobile network, comprising:
   at least one hardware processor adapted to provide an inter-process communications firewall on a device to enforce one or more rules governing communication between a first system and a second system that communicate via the device, wherein the inter-process communications firewall is an object firewall, wherein an object on the first system provides access to a resource allowing communication with the second system, wherein the inter-process communications firewall is the only object firewall for the object and wherein the inter-process communications firewall is not an object firewall for any other object;
   said at least one hardware processor adapted to generate, via a policy engine associated with the inter-process communications firewall, an indicator of a context of the first system;
   said at least one hardware processor adapted to receive an inter-process communication call from the first system intended for communication to the second system;
   said at least one hardware processor adapted to pass the inter-process communications call to the policy engine, wherein passing the inter-process communications call comprises passing the indicator of the context of the first system to the policy engine via inter-process communications;
   said at least one hardware processor adapted to execute the policy engine to determine whether the inter-process communication is permitted by the inter-process communications firewall based on a policy and the context of at least one of the systems; and
   said at least one hardware processor adapted to at least one of permit and block the interprocess communication call in response to the determination, wherein at least one of permitting and
   blocking the inter-process communication call in response to the determination further comprises at least one of permitting the inter-process communication call without modification, permitting the inter-process communication call with modified contents of the inter-process communication call, permitting the inter-process communication call with a modified return value of data sent from a resource in response to the inter-process communication call, blocking the inter-process communication call, logging the inter-process communication call, ignoring the inter-process communication call, modifying one or more firewall rules, adding one or more firewall policies, and removing one or more firewall policies.

13. The system of claim 12, wherein the at least one processor is adapted to provide a plurality of inter-process communications firewalls on a device, wherein each inter-process communications firewall of the plurality of inter-process communications firewall is the only object firewall for an object of a plurality of objects and wherein each inter-process communications firewall of the plurality of inter-process communications firewalls is not an object firewall for any other object of the plurality of objects.

14. The system of claim 12, wherein the at least one processor is further adapted to generate the policy engine wherein the policy engine is enabled to communicate with a policy server to communicate one or more policies.

15. The system of claim 12, wherein the policy is comprised of one or more of a black list, a white list, a signing policy, a naming policy, a checksum analysis policy, a library analysis policy, and a permission for one or more of an application, a process, a user, and a group of users.

16. The system of claim 12, wherein said at least one processor adapted to determine whether a communication between the first system and the second system is permitted by the inter-process communications firewall is further based on content of the communication.

17. A method of securing a mobile device from malware, comprising:
using a computer processor, passing a remote procedure call intended for a second application from a first application to an inter-process control data bus;
requesting, from a policy engine by the inter-process control data bus, a policy validation for the remote procedure call, wherein the policy validation is performed by an object firewall, wherein the object firewall is the only object firewall for an object of the second application, wherein each object of a plurality of objects of the second application has an independent object firewall, and wherein the object firewall is set based on a policy;
determining by the policy engine whether to approve the remote procedure call based on a context of the remote procedure call and a stored policy;
communicating the determination from the policy engine back to the inter-process control data bus; and
at least one of permitting and blocking the remote procedure call by the interprocess control data bus in response to the determination, wherein at least one of permitting and blocking the remote procedure call by the inter-process control data bus in response to the determination further comprises at least one of permitting the remote procedure call without modification, permitting the remote procedure call with modified contents of the remote procedure call, permitting the remote procedure call with a modified return value of data sent from a resource in response to the remote procedure call, blocking the remote procedure call, logging the remote procedure call, ignoring the remote procedure call, modifying one or more firewall rules, adding one or more firewall policies, and removing one or more firewall policies.

18. The method of claim 17, wherein passing the remote procedure call further comprises passing a remote procedure call for a second object associated with the second application from a first object associated with the first application to an inter-process control data bus.

19. The method of claim 17, wherein the policy engine is further enabled to communicate with a policy server to communicate one or more policies.

20. The method of claim 17, wherein the method further comprising providing an interprocess controller for installing new object firewalls as new objects are created.

21. The method of claim 17, wherein the policy engine further comprises a contextaware policy engine.

22. The method of claim 21, wherein the context-aware policy engine is further enabled to generate a system-specific context, said system-specific context comprising one or more of a current date, a current time, a location of the mobile device, an identity of a user of the device user, and applications currently executing on the mobile device.

* * * * *